No. 677,809. Patented July 2, 1901.
G. W. SHIELDS.
THREE BALL METALLIC FLEXIBLE JOINT COUPLING.
(Application filed Dec. 17, 1900.)
(No Model.)
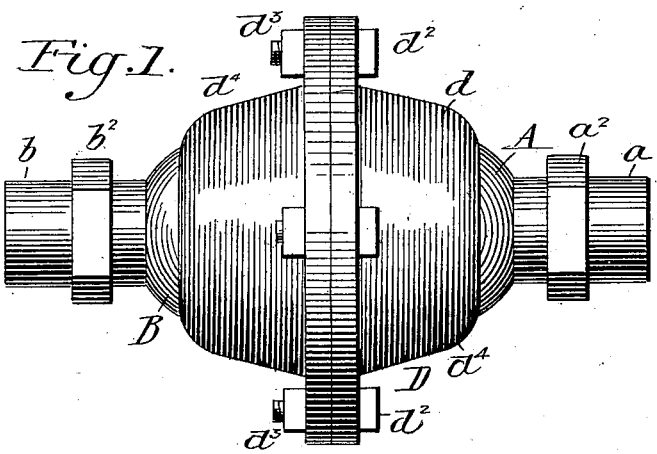
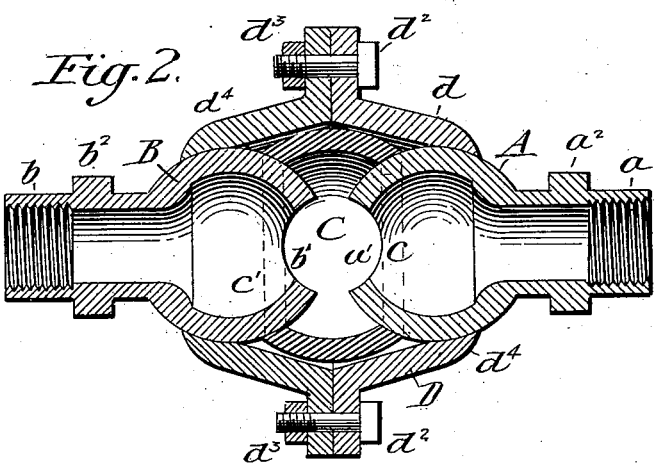
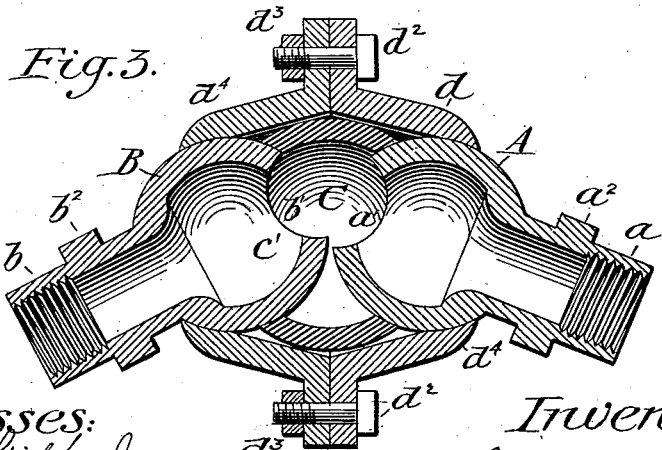
Witnesses:
Inventor:

UNITED STATES PATENT OFFICE.

GEORGE W. SHIELDS, OF LOUISVILLE, KENTUCKY, ASSIGNOR TO THE SHIELDS FLEXIBLE JOINTS COMPANY, OF SAME PLACE.

THREE-BALL METALLIC FLEXIBLE-JOINT COUPLING.

SPECIFICATION forming part of Letters Patent No. 677,809, dated July 2, 1901.

Application filed December 17, 1900. Serial No. 40,116. (No model.)

*To all whom it may concern:*

Be it known that I, GEORGE W. SHIELDS, a citizen of the United States, residing at Louisville, in the county of Jefferson and State of Kentucky, have invented certain new and useful Improvements in Three-Ball Metallic Flexible-Joint Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in metallic flexible-joint couplings for pipes used to convey steam or liquids; and it consists in the novel construction and combination of parts hereinafter set forth.

In the drawings, Figure 1 is a front elevation of my improved coupling. Fig. 2 is a longitudinal sectional view of the same on a medial line, and Fig. 3 is a longitudinal sectional view on a medial line of the joint flexed from both ends.

My coupling consists of three round hollow balls arranged rectilinearly and held in connection by a surrounding casing. The end balls of the line each have a pipe-nozzle threaded to receive the piping, extending centrally outward from it, and each is provided with a circular opening diametrically opposite to the nozzle-opening and of the same diameter as the nozzle. The middle ball has a circular opening at each pole of diameter sufficient to admit the two end balls to such a distance that in whatever direction they may be moved the apertures in them will be within the inner ball. To hold the balls in proper juxtaposition, they are placed within a hollow case divided at the middle in two equal parts, having flanges projecting outwardly around their middle edges by which they may be fastened securely together, and circular openings at the outer ends of diameter sufficient to allow the end balls to project as far as they enter into the inner ball. The interior surface of the case does not come in contact with the balls except near these circular outer openings, where it serves as bearings for the end balls and is ground to fit perfectly true to the outer surface of the balls, so that there can be no leakage between them and the case. The middle hollow ball has its bearings on the outer surfaces of the end balls, the edges of the polar apertures in the middle ball being ground to fit true to the outer surfaces of the end balls entering them.

In the drawings, A represents one of the end balls; $a$, its pipe-nozzle; $a'$, the opening opposite its pipe-nozzle, and $a^2$ laterally-projecting lugs on the nozzle to give a firm hold while screwing the pipes into the coupling-joints. B represents the other end ball; $b$, its nozzle; $b'$, the opening opposite the nozzle, and $b^2$ the holding-lugs on the nozzle.

C represents the middle ball, and $c$ and $c'$ the openings at its poles.

D represents the case surrounding the balls, divided in the middle into two equal parts $d$ and $d'$.

$d^2$ and $d^3$ represent, respectively, the exterior flanges around the middle edges of the halves $d$ and $d'$, and $d^4$ the shoulders formed by the ends of the case D.

The limit of flexion of the coupling is determined by the shoulders $d^4$, the distance of which from the outer surface of the nozzles of the end balls when the balls are in a rectilinear position should correspond exactly with the distance to which the end balls enter into the middle ball.

When the steam or liquid flows into the joint from one end, its weight increases the pressure of the inner ball on its bearings and lessens any tendency to leakage. In whatever position the end balls A and B may be thrown by the flexion of the pipes the apertures $a'$ and $b'$ will be within the ball C, so that the steam or liquid can flow through the joint uninterruptedly.

My joint affords the same facilities for changing the direction of lines of piping as a rubber-tube joint. The piping attached to one of the end balls can be moved forward, backward, or sidewise, while that attached to the other end ball can be moved in the same or opposite direction or at any desired angle.

Having thus described my invention, what I claim as new, and desire to secure by Letters Patent, is—

1. A flexible pipe-joint coupling comprising three independently-movable conduit-sections all balls jointed together on universal joints of equal radii, and means independent of the intermediate section for holding the outer sections against movement apart or away from the intermediate section.

2. In a flexible-joint coupling the combination of movable pipe connections or balls, an intermediate joint-piece forming a conduit from one pipe to another or to others and having bearings fitting said pipe connections externally in which bearings the said pipe connections are movable, and an outer casing around said joint-piece and having bearings fitting said pipe connections in or on which bearings said pipe connections are movable.

3. In a flexible-joint coupling the combination of movable pipe connections or balls, a casing or bearing-piece having bearings in or on which said pipe connections fit and are adapted to turn, and an intermediate joint-piece having bearings fitting and partly inclosing said pipe connections and independent of said bearing-piece.

4. In a flexible-joint coupling the combination of movable pipe connections or balls, a bearing-piece forming with said pipe connections joints in or on which the said connections may turn, and an intermediate joint-piece opposing said connections to hold the same in contact with said bearing-piece and fitting said connections externally with joints or bearings in which the latter may turn.

5. In a flexible-joint coupling the combination of a movable pipe, ball or connection having a bearing-surface, an opposing pipe or connection, a bearing piece or casing acting to hold said pipes from movement away from each other and having a bearing in or on which said movable pipe may turn, and an intermediate joint-piece or conduit-section fitting said pipes externally and having a bearing for said movable pipe.

6. In a flexible-joint coupling the combination of two or more pipes, balls or conduit-sections provided with bearing-surfaces, an intermediate joint-piece and conduit-section fitted to said pipes to allow the flexion of one or more of the latter, and an exterior bearing-piece fitted to said pipes on the same bearing-surfaces as said intermediate joint-piece to allow flexion, extending past said intermediate joint-pieces and holding said pipes or balls in proper relation to the latter.

7. In a flexible-joint coupling the combination of movable pipe connections, balls or ends, an intermediate joint-piece forming a conduit from one pipe to another and having bearings fitting said pipe connections externally and an exterior bearing-piece fitting said pipe connections and holding all of said parts in proper relation to each other, said bearing-piece being formed in two or more adjustable parts.

8. A flexible joint for pipes consisting of three round hollow metallic balls, one placed between the other two, the one placed in the middle having circular openings at its opposite poles, the end balls having radial nozzles threaded to receive piping projecting outward and circular openings diametrically opposite to the nozzle and of the same diameter, the end balls projecting into the middle ball through its polar openings and furnishing bearings on their outer surface for the inner ball, said balls inclosed and held in juxtaposition by a hollow case divided in the middle into two equal parts having outwardly-projecting flanges around the middle edges and circular openings in its ends of diameter sufficient to allow the end balls to project outwardly to the same distance as they enter the inner ball, said case in contact only with the outer balls near its ends where its inner surface is ground to fit the outer surface of the end balls and furnish bearings for the same, substantially as described and for the purposes specified.

9. In a flexible-joint pipe-coupling the combination of two hollow balls having bearing-surfaces, a casing or bearing-piece fitting said surfaces to hold the balls from movement away from each other and allow their flexion, and an intermediate joint and conduit-piece having bearings engaging the convex surfaces of said hollow balls.

10. In a flexible conduit-coupling the combination of a plurality of hollow balls, one or more of which is movable, a joint-piece intermediate of said balls, forming a conduit-section from one ball to another and having outwardly-concave bearings engaging the convex surfaces of said balls to hold the same from movement toward each other, and a bearing-piece extending past said joint-piece and having bearings on said balls to hold the same against said joint-piece.

11. In a flexible pipe-joint the combination of pipe-sections having ball-bearing surfaces, an intermediate conduit-section or joint-piece having narrow edges bearing on said ball-surfaces and acting to hold said pipe-sections apart, and a connecting means acting to hold said pipe-sections together and having bearings engaging said pipe-sections.

In testimony whereof I affix my signature in presence of two witnesses.

GEORGE W. SHIELDS.

Witnesses:
 JOSEPH SHORT,
 R. M. KELLY, Jr.